Aug. 17, 1943. S. A. GRAFSLAND 2,326,939
REPAIR AND SALES RECORD CARD
Filed June 5, 1940
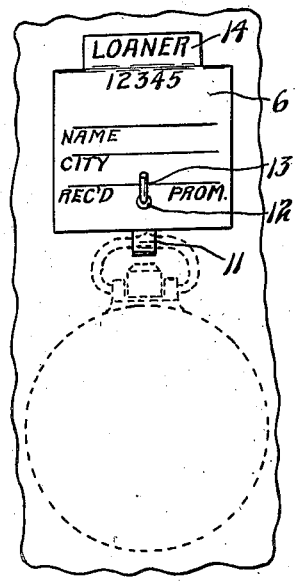
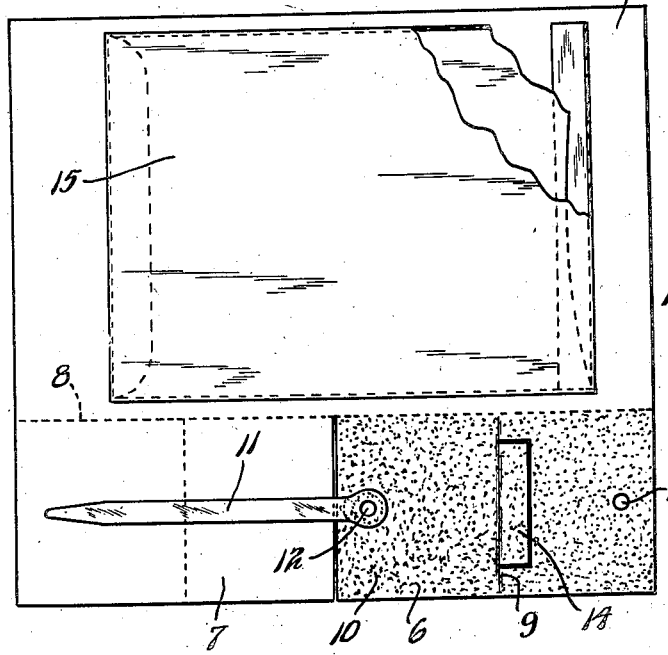
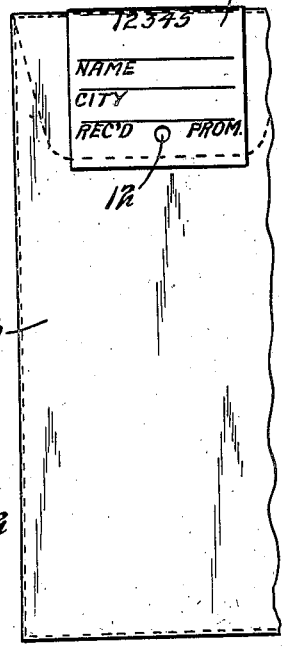
INVENTOR.
SIGURD A. GRAFSLAND.
BY HIS ATTORNEYS.
Williamson & Williamson Patented Aug. 17, 1943

2,326,939

UNITED STATES PATENT OFFICE 2,326,939

REPAIR AND SALES RECORD CARD

Sigurd A. Grafsland, Minneapolis, Minn., assignor of one-half to Paul T. Grafsland, Minneapolis, Minn.

Application June 5, 1940, Serial No. 338,916

1 Claim. (Cl. 40—21)

This invention relates to a repair and sales record card which is particularly adaptable for use in connection with the repair and sales of watches and articles of jewelry.

One of the objects of my invention is to provide a card, one portion of which is adapted to receive notations relative to the transaction which may be filed away as a permanent record and in combination with this card to provide a detachable ticket portion adapted to be connected with the watch or other article when it is taken in by the jeweler and also a claim check which can be detached from the main card and which identified itself with the permanent record card portion and with that portion attached to the article being repaired.

Another object of the invention is to provide a ticket which is adapted to connect with an article supporting element, the ticket including means for suspending the article to which it is connected in a rack or similar structure where the article is stored after repairing.

Another object of the invention is to provide means in combination with the detachable ticket which can be manipulated to at all times plainly indicate whether the jeweler has loaned a watch or in the case of other articles a substitute for the one left for servicing and repair.

These and other objects and advantages of the invention will more fully appear from the following description made in connection with the accompanying drawing, wherein like reference characters refer to the same parts throughout the views, and, in which:

Fig. 1 is a plan view of an embodiment of my invention;

Fig. 2 is a bottom view thereof;

Fig. 3 is a detail showing one form of article supporting structure; and

Fig. 4 is a fragmentary view of another form of article supporting structure.

In the drawing it will be seen that I have provided a card comprising a relatively large main portion 5 and a pair of detachable portions 6 and 7 which are secured to the main card by a perforated line 8. The main card portion 5, as is illustrated, carries on its front face a plurality of spaces marked off and designated to receive information concerning the identity of the owner of the article as well as information concerning the type of transaction both from a repair or sales standpoint as well as the amount of money involved in the transaction. The detachable portion 6 provides a ticket or tag which can be conveniently torn from the main portion 5 and which is adapted to be secured to the article, such as a watch, for repair and the other detachable portion 7 constitutes a claim check bearing identification which is also found on the main card 5 and the tag 6.

The tag 6, as viewed in Fig. 1, has a space at its right-hand side which bears the number also found on the claim check 7 and on the main card 5 as well as the identity of the owner of the article. Transversely across the center of the tag 6 is a line 9 which represents a scoring or fold to permit the tag 6 to be bent upon itself and the left-hand portion of the tag has a space for notations which the jeweler or repair man might like to make. As shown in Fig. 2, the rear portion of the tag 6 is provided with a coating 10 of adhesive. Extending from one end portion of the tag is a long narrow strip of paper or cloth 11, one end of which is adhesively or otherwise suitably secured to the underside of the tag and the other end of which is free. When it is desired to secure the tag to a watch or other article it is bent upon itself on the fold line 9. The strip 11 is passed through a portion of or around the article to which it is to be attached, as indicated in Fig. 3, and the free end of said strip is secured between the folded halves of the tag 6 with the adhesive 10 securely fastening the formerly free end of said strip. This provides a convenient loop which positively secures the tag to the article. It will also be seen that the tag 6 has a pair of apertures 12 formed in opposite ends. When the tag is folded on itself the apertures 12 will register and it is possible then to slip the tag over some suitable supporting element such as a pin 13 extending from a board 13a or a rack on the repair table or at some other convenient location.

The left-hand half of the tag 6 is shown with a tongue portion 14 formed therein, said tongue being attached to the ticket preferably along the ticket fold line 9. It will be seen that it bears the notation "loaner." If a watch is being repaired and the repair man or jeweler has loaned a watch to replace the one upon which repairs are to be made, the ticket is merely bent upon itself and the tongue 14 will extend upwardly with the word "loaner" in view, as shown in Fig. 3. If no watch is loaned to replace the one being repaired, the tongue 14 is merely folded with the remainder of the tag 6 so that it will lie in back of the exposed half of the tag, as viewed in Fig. 3, and the information is instantly available at a glance as to the loaning of a watch.

On the rear of the main card portion 5, as shown in Fig. 2, there is secured a paper or other suitable bag 15 which is attached by means of a suitable adhesive substance which will permit the bag to be removed from the card portion 5 by exerting a relatively light pull which is insufficient to tear the bag. A bag such as this is used for small pieces which might be broken from the main article to be repaired or to hold small articles which it is impractical to secure with the loop strip 11. When the bag 15 is used the tag 6 is folded over the top edge of the bag and adhesively secured thereto as shown in Fig. 4. A supporting pin, such as the pin 13, can be readily punched through the bag material and through the openings 12 in the ticket, or if desired, the bag may be retained on the main file card 5. Where the article is fairly bulky, however, a larger separate bag 16 can be used to retain the article and smaller unconnected articles. As seen in Fig. 4, this bag is adhesively connected with the tag 6 and is adapted to be suspended in the same manner as in Fig. 3.

The permanent record card 5 has a corner portion 5a marked off by a score line, as shown, and when the repair job has been completed, said corner portion is torn off and the card is placed in the permanent file. This provides means for readily finding permanent record cards in a file which relate to a repair job which has not been completed since in such a case the corner portion 5a will not have been torn off and it will project above the corners of those cards where the corners have been torn to indicate completed transactions.

When an article is left for repair the customer should sign his name at the upper central portion of the card at the place indicated, and when he calls for the article he can be asked to again sign his name at the bottom of the card where the word "signature" appears in order to verify the identification such as is usually furnished by the claim check 7.

Attention is also called to the method in which the articles are suspended from the pegs 13 by means of tags 6. The usual method of identifying a watch or similar article is to secure a tag thereto by means of a light piece of string, and the watch or other article is usually hooked directly to a supporting pin or hook on a backboard. The tags secured by strings become tangled together due to the proximity of adjacent articles and frequently the tags become reversed in position so that it is difficult to read them to identify the articles to which they are attached. It will be seen that the tags 6 remain in a stationary upright position thus making it extremely easy to read them when they are mounted on supports such as the pins 13.

It will be seen that the complete card units furnish all the material necessary for providing a permanent record of the particular repair job or other transaction as well as furnishing a claim check for the customer and a tag adapted to be attached to the article and left thereon during the time it is retained for repair so that no confusion will result from the inability to identify the proper article when the claim check is presented. Furthermore, when the claimant presents his check and the jeweler or repair man gets the article called for he can instantly determine whether a substitute article has been loaned to the claimant while his own property was being repaired. Means are provided for conveniently attaching the tag to the article or for suspending the article from the tag. The complete unit is compact and takes up little more room than an ordinary paper card, but it can be quickly separated into its component parts for convenient use. Additionally, it is relatively simple to manufacture and can be produced for a low cost.

It will, of course, be understood that various changes may be made in the form, details, arrangement and proportions of the various parts without departing from the scope of my invention.

What is claimed is:

A card of the class described comprising, a sheet of material having a fold line transversely thereacross intermediate its ends, means connected to said sheet for securing the sheet to an article of jewelry and the like, said sheet including means for supporting it and the article of jewelry, and said sheet including a cut-out portion adjacent said transverse fold line and bearing visible indicia and extending above said fold line when said sheet is folded on said fold line.

SIGURD A. GRAFSLAND.